March 27, 1962 K. N. MOSELEY 3,027,007
LUMBER SORTER
Filed Sept. 29, 1958 2 Sheets-Sheet 1
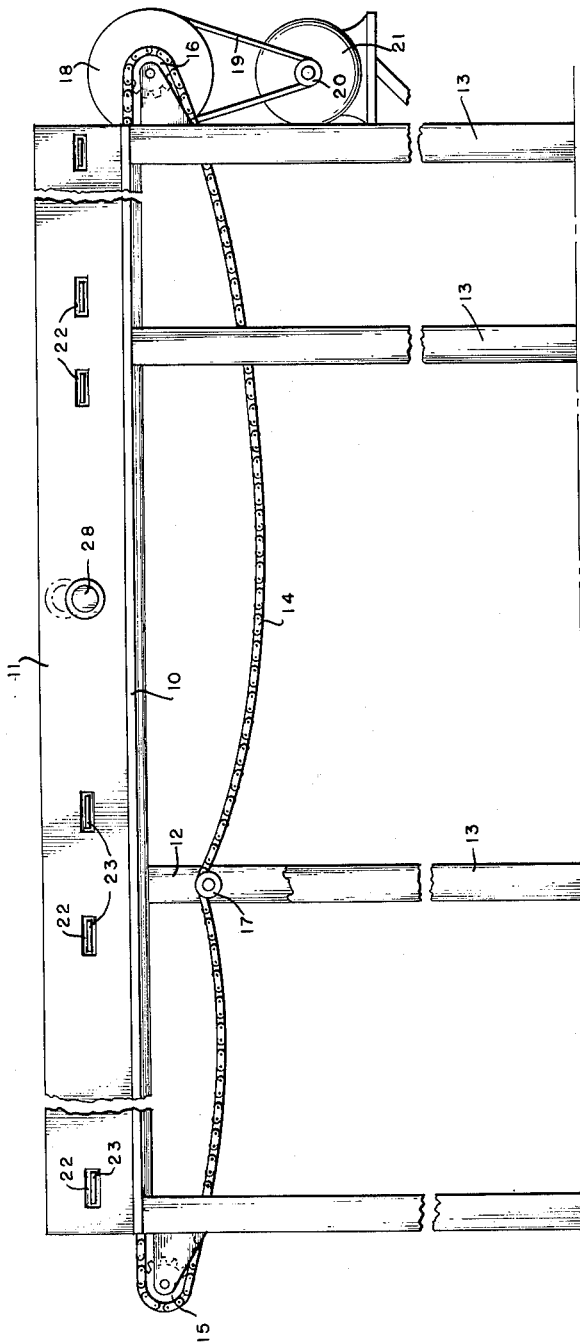
FIG. I
INVENTOR
K. N. MOSELEY
BY *Wyatt Dowell*
ATTORNEY March 27, 1962 K. N. MOSELEY 3,027,007
LUMBER SORTER
Filed Sept. 29, 1958 2 Sheets-Sheet 2
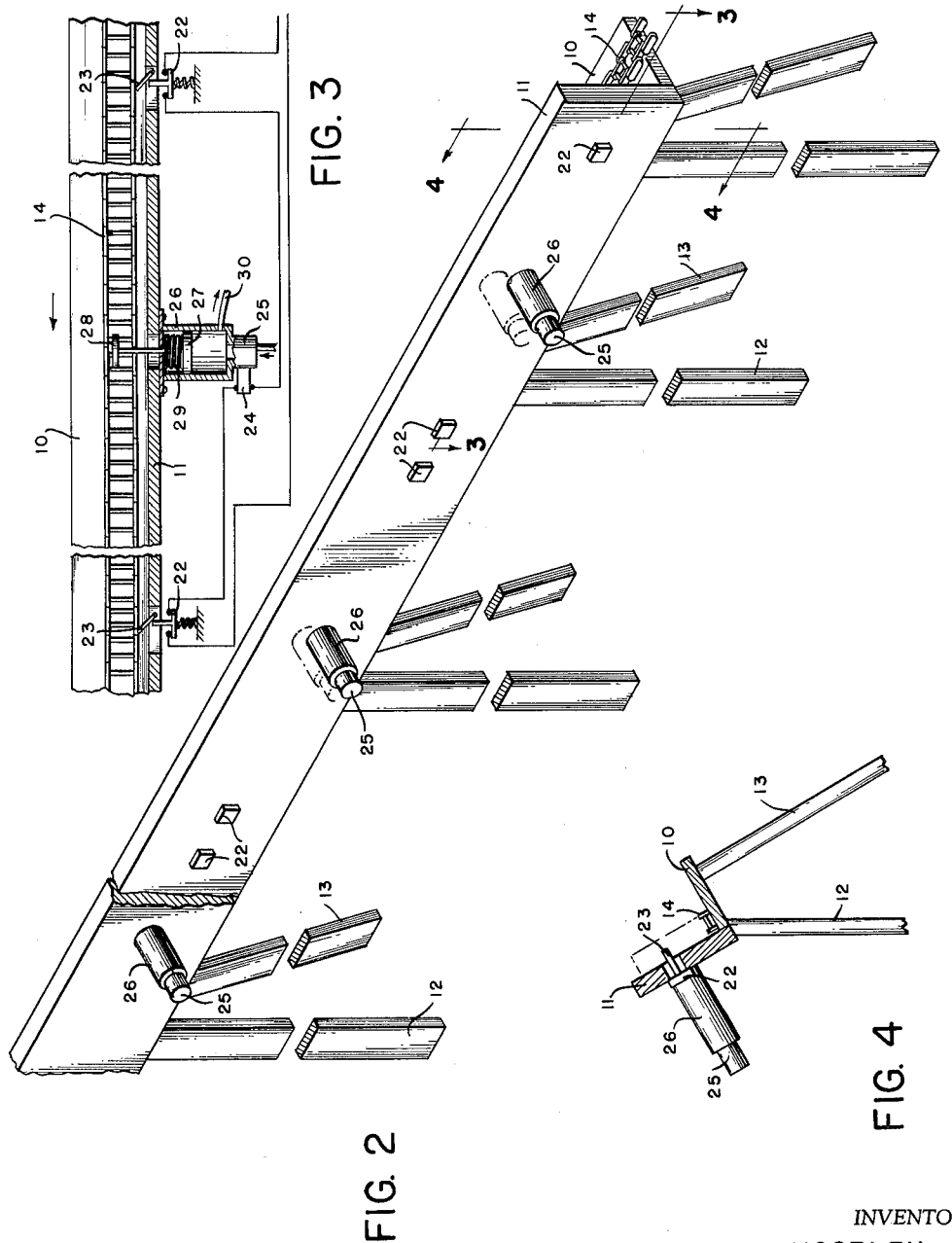
INVENTOR
K. N. MOSELEY
BY
ATTORNEY

United States Patent Office 3,027,007
Patented Mar. 27, 1962

3,027,007
LUMBER SORTER
Kemper N. Moseley, 1014 Gloria Ave., Durham, N.C.
Filed Sept. 29, 1958, Ser. No. 763,952
5 Claims. (Cl. 209—90)

This invention relates to the sorting or separation of materials and to equipment employed in such operation, and more particularly to a device for sorting or separating lumber according to length and width.

The separating of lumber has been laborious and expensive; consequently, efforts have been made to provide equipment for the sorting thereof, as for example, that disclosed in my Patent No. 2,733,808, granted February 7, 1956.

It is an object of the present invention to provide a lumber sorter which is relatively simple and inexpensive and which will discharge predetermined lengths and widths of lumber at specified stations.

Another object of the invention is to provide a lumber sorter including pneumatic or hydraulic means for ejecting lumber from a trough or runway controlled by pairs of microswitches.

Other objects and advantages of the invention will be apparent from the following description taken in conjunction with the accompanying drawings wherein:

FIG. 1 is a side elevation illustrating one application of the invention;
FIG. 2, a rear perspective;
FIG. 3, a section on the line 3—3 of FIG. 2; and
FIG. 4, a section on the line 4—4 of FIG. 2.

Briefly stated, the lumber sorter of the present invention includes an elongated trough having a rear side inclined slightly relative to the vertical in order that lumber may rest therein as it is moved endwise along the trough. A chain conveyor is utilized to carry the lumber along the trough, the conveyor having its upper or top run lying in the trough and on which the edges of the lumber rest in a manner to be carried along thereby. Selector units or ejection stations are provided as desired along the length of the trough for accomplishing the desired purpose. These ejection stations are in the form of microswitches spaced along the trough at varying intervals with two switches for each station being connected in series to energize a pneumatic or hydraulic cylinder for ejecting the lumber from the trough, several stations being designed to eject lumber of different lengths and widths.

With continued reference to the drawings, the lumber sorter of the present invention comprises a trough having a substantially horizontal portion 10 and an upright portion 11 of integral or unitary construction. The trough may be slightly tilted or canted to cause gravitation toward the center of the same and the trough is mounted on a pair of legs 12 and 13. The legs 13 are inclined to cause lumber ejected from the trough to move down the same away from the trough to reduce breakage.

The upper run of a conveyor chain 14 is disposed within the trough and rests on the lower side in a manner to receive material such as lumber and to carry it along the trough. Conveyor chain 14 extends over a pair of sprockets 15 and 16, one at each end of the trough and over one or more idler pulleys 17 intermediate the sprockets 15 and 16. The sprocket 16 is driven by a pulley 18 from a belt 19 and a pulley 20 by a motor 21 mounted on one end of the device, as, for example, on the legs 12 and 13.

A series of stations are disposed along the trough where lumber of a specified length and width may be ejected. The length and width of the lumber ejected is controlled at each station by a pair of microswitches 22, each having a trip arm 23 adapted to be engaged by the lumber as it travels along the trough, and such microswitches are connected electrically in series with a solenoid switch 24 which governs an air supply valve 25 operatively associated with a cylinder 26 and piston 27 having an ejector head 28.

The pair of microswitches 22 are normally closed so that a circuit is completed through the solenoid switch 24 which opens the air valve 25 and maintains the piston 27 in an extended position substantially across the trough. When the first microswitch is engaged by a piece of lumber, the current to the solenoid switch will be interrupted and the air valve 25 will close thereby permitting a spring 29 to retract the piston 27 and force the air in the cylinder 26 out through a bleeder line 30. If the piece of lumber is of sufficient length to engage the second microswitch before it disengages the first microswitch, the circuit will remain open and the piece of lumber will be carried to the next succeeding station. If, however, the piece of lumber does not engage the second microswitch prior to disengaging the first microswitch, the circuit will be completed and the air valve 25 will open to permit air under pressure to force the piston 27 outwardly to its extended position and thereby eject the lumber in front of such piston.

In order to eject lumber of different widths, the cylinder 26 may be mounted on the upright portion 11 of the trough and in varying spaced relation with the conveyor at each station. As an example, the trough may be provided with several stations in which the length between the microswitches is identical and the distance between the conveyor and the ejector head of the piston varies according to the width of the lumber to be ejected. For instance, the first station may be adapted to eject lumber which is eight feet long and twelve inches wide; the second station may eject lumber which is eight feet long and ten inches wide; the third station may eject lumber which is eight feet long and eight inches wide; etc. The next group of stations may eject lumber which is at least ten feet long, etc.

The invention is not limited to the specific lengths and widths stated nor to the specific material since it will eject any strip material including wood, metal or plastic with equal ease.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:
1. A lumber sorter comprising a trough having substantially horizontal and upright portions, said trough being slightly tilted so that lumber contained therein will gravitate toward the center, supporting means for said trough, conveyor means located within said trough to convey lumber therethrough, a series of sorting stations disposed along said trough, each of said stations comprising a pair of switches connected in series and having portions disposed in the path of movement of lumber carried by said conveyor means, a fluid operated cylinder mounted intermediate said pair of switches, a piston operated by said cylinder and having an ejector head arranged to travel across the trough to eject lumber, an electrically operated valve connected to said cylinder for regulating the fluid supply thereto, said valve being connected in series to said switches whereby when either switch is engaged by lumber the piston will be retracted and allow the lumber to pass and when neither switch is engaged by lumber the piston will be extended, and said switches being spaced apart a predetermined distance.
2. The structure of claim 1 in which said cylinder of each station is located a predetermined elevation above said conveyor means.

3. The structure of claim 2 in which said pair of switches of at least two stations are spaced substantially the same distance apart and said cylinder of each of said two stations are located at different elevations.

4. A lumber sorter comprising a trough, supporting means for said trough, conveyor means located in a manner to cause lumber to move along said trough, sorting stations along said trough each comprising a pair of lumber length control elements spaced apart a predetermined distance and connected in series, said elements having portions located in the path of movement of lumber along said trough, ejector means located intermediate each pair of control elements and arranged to move transversely of the trough sufficient to eject lumber from the trough, said ejector means being connected in series with said control elements, whereby when either control element is engaged by lumber the ejector mechanism will be inoperative allowing the lumber to pass, and when neither control element is engaged by lumber the ejector mechanism will be caused to operate to discharge lumber located intermediate said control elements.

5. In a lumber sorter comprising means for the lengthwise movement of lumber, length determining control elements located in spaced relation along said path of lengthwise movement, ejector means located intermediate said length determining control elements, said ejector means being subject to the operation of said control elements.

References Cited in the file of this patent

UNITED STATES PATENTS

| | | |
|---|---|---|
| 1,202,838 | Heffernan | Oct. 31, 1916 |
| 2,033,645 | Parkhill | Mar. 10, 1936 |
| 2,138,645 | Rey | Nov. 29, 1938 |
| 2,359,890 | Birdsall | Oct. 10, 1944 |
| 2,415,177 | Hurley | Feb. 4, 1947 |
| 2,630,043 | Kolisch | Mar. 3, 1953 |
| 2,636,601 | Bovay | Apr. 28, 1953 |
| 2,651,412 | Aller | Sept. 8, 1953 |
| 2,733,808 | Moseley | Feb. 7, 1956 |
| 2,876,815 | Rogers | Mar. 10, 1959 |